United States Patent
Sasuga

(10) Patent No.: US 7,538,830 B2
(45) Date of Patent: May 26, 2009

(54) LIGHT-EMITTING APPARATUS

(75) Inventor: Masatoshi Sasuga, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 610 days.

(21) Appl. No.: 11/111,830

(22) Filed: Apr. 22, 2005

(65) Prior Publication Data

US 2005/0243237 A1    Nov. 3, 2005

(30) Foreign Application Priority Data

Apr. 30, 2004    (JP)   ............................. 2004-136755

(51) Int. Cl.
*G02F 1/1335*    (2006.01)

(52) U.S. Cl. .............................. 349/57; 349/58; 349/67

(58) Field of Classification Search .................... 349/57
See application file for complete search history.

(56) References Cited

U.S. PATENT DOCUMENTS

| | | | |
|---|---|---|---|
| 6,549,730 B1 * | 4/2003 | Hamada | 396/111 |
| 7,304,705 B2 * | 12/2007 | Sugimoto et al. | 349/141 |
| 2002/0145701 A1 * | 10/2002 | Sun et al. | 349/200 |

FOREIGN PATENT DOCUMENTS

JP    2003-158301 A    5/2003

* cited by examiner

*Primary Examiner*—Richard H Kim
(74) *Attorney, Agent, or Firm*—Browdy and Neimark, P.L.L.C

(57) ABSTRACT

A light-emitting apparatus, comprising at least one LED element, and at least one liquid crystal lens disposed to face the LED element and positioned at a distance from the LED element, a focal length of light, broadening and narrowing directions of light, and changing the illuminating area of light being adjustable by applying a voltage to the at least one liquid crystal lens and a light-emitting apparatus, further comprising at least one lens placed on the liquid crystal lens.

9 Claims, 4 Drawing Sheets

LIGHT-EMITTING APPARATUS

CROSS-REFERENCE TO THE RELATED APPLICATION

The application claims the priority benefit of Japanese Patent Application No. 2004-136755, filed on Apr. 30, 2004, the entire descriptions of which are incorporated herein by reference.

BACKGROUND OF THE INVENTION

1. Field of the Invention

The present invention relates to a light-emitting apparatus, more specifically to a light-emitting apparatus in which a focusing position of light emitted from a light-emitting source, broadening and narrowing directions of emitted light, and changing the illuminating area are electrically controlled.

2. Description of Related Art

There is generally known that a light-emitting apparatus includes a light-emitting source such as a light-emitting diode (LED) element, a filament lamp or the like, and a convex lens disposed in front of an emission surface of the light-emitting source, and the convex lens works to focus light emitted from the emission surface of the light-emitting source on an object.

An example of a conventional light-emitting apparatus is shown in FIG. 8. The light-emitting apparatus has a case 1, an LED element 2 disposed in the case 1, and a normal convex lens 3 attached to the case 1 to face the LED element 2. The case 1 has a truncated conical-or truncated pyramidal-shaped concave portion 4, and the inner surface of the concave portion 4 has a reflecting surface 5 configured to increase reflection efficiency of light. The convex lens 3 is structured to focus light emitted from the LED element 2 to the object positioned apart from the light-emitting apparatus by a predetermined distance and to illuminate the object. The conventional light-emitting apparatus is used for reading CDs or the like and headlights of automobiles.

In addition, a conventional light-emitting apparatus having a structure similar to that of the above-mentioned light-emitting apparatus is disclosed in JP 2003-158301A, FIG. 3, for reference.

However, because each of the conventional light-emitting apparatuses as described above uses the normal convex lens 3 having a fixed focal length, an angle or focusing position of light emitted from the convex lens cannot be changed. In other words, an illumination scope, light-intensity distribution, or directions of emitted light cannot be changed in the conventional light-emitting apparatuses.

It is considered that a focal length for one lens or a plurality of lenses disposed in front of the light-emitting source is changed in order to change the illumination scope and so on. In order to achieve the change for the focal length, directions of emitted light, and the illuminating area a mechanism must be provided to move a focal length of one lens or at least one lens of the plurality of lenses relative to the light-emitting source, there is a problem that the light-emitting apparatus has a complicated structure.

SUMMARY OF THE INVENTION

An object of the present invention is to provide a light-emitting apparatus capable of changing a focal position of light emitted from a light-emitting source by applying a current to a liquid crystal lens in order to illuminate various objects having different sizes or disposed in different distances efficiently.

Another object of the present invention is to provide a light-emitting apparatus capable of collecting, broadening and changing directions of light emitted from a light source by applying the current to the liquid crystal lens in the light-emitting apparatus. For example, the present invention may have applicability to spotlights that illuminate a small area with a strong beam of light, and interior lightings to illuminate a whole space and concealed lightings to illuminate a small space.

Further, another object of the present invention is to provide a light-emitting apparatus for vehicles such as automobiles, motorcycles, trains, bicycles, and so on. For example, the present invention may have applicability to integrated high beam and low beam functions of headlights of those vehicles and also flashlights.

According to one embodiment of the present invention, the light-emitting apparatus includes at least one LED element, and at least one liquid crystal lens disposed to face the LED element and spaced from the LED element. A focal length of the liquid crystal lens, broadening and narrowing directions of emitted light, and changing the illuminating area can be changed by applying the current to the liquid crystal lens with a controlling device. The LED element and the liquid crystal lens are supported by a case.

According to another embodiment, the light-emitting apparatus includes at least one lens placed on the liquid crystal lens.

According to still another embodiment, the light-emitting apparatus includes at least one liquid crystal shutter placed on the liquid crystal lens.

DETAILED DESCRIPTION OF THE PREFERRED EMBODIMENTS

Preferred embodiments of the present invention will be explained with reference with the accompanying drawings below.

Figure 1:
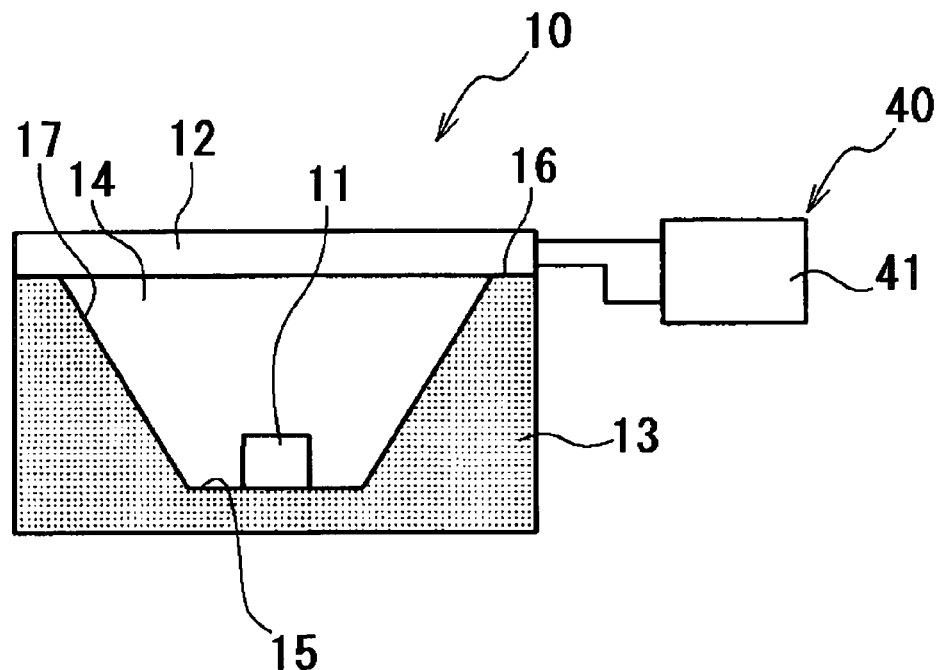
FIG. 1 is a sectional view showing a first embodiment of a light-emitting apparatus according to the present invention.

Referring to FIG. 1, a first embodiment showing a basic structure of a light-emitting apparatus according to the present invention is illustrated.

The light-emitting apparatus 10 in the first embodiment comprises at least one LED element, and at least one liquid crystal lens disposed to face the LED element and spaced from the LED element.

If the light-emitting apparatus according to the present invention is used for a flashlight of a camera, interior lightings, and spotlights, Red-Green-Blue (RGB)-color LED elements or a combination of white LED comprising a blue LED element and fluorescent material(s) and a red LED may be used for color rendering properties.

LED element(s) used in the embodiments of the present invention may be covered by a translucent resin containing fluorescent material(s). The translucent resin may also contain dye compound(s).

If the light-emitting apparatus according to the present invention is used for a flashlight of a camera, condensing and broadening light may work directly with auto-focus function of camera by connected to the auto-focus-controlling device of camera.

Concretely, the LED element 11 and the liquid crystal lens 12 may be supported by a case 13. The case 13 has a rectangular shape in section in the first embodiment, and a concave portion 14 provided on a central portion thereof. The concave portion 14 has a truncated-conical shape in the illustrated embodiment. Alternatively, the concave portion 14 may be a pyramidal shape instead of the conical shape as described above. The case may integral molding or may comprise a frame and a substrate. When the case comprising a frame and a substrate is used, LED element(s) may be disposed on the substrate and be surrounded by the frame.

On a bottom surface of the concave portion 14 an LED-element-mounting surface 15 for laying the LED element 11 thereon is provided.

The LED element is electrically connected to the electrodes (not shown) provided in the case 13. The means to supply the electricity to the LED element 11 may be chosen from various conventional technology. The case 13 has also a lens-mounting surface 16 for laying a peripheral portion of the liquid crystal lens 12 thereon and an inclined reflecting surface 17 extending from the LED-LED-element-mounting surface 15 to the lens-mounting surface 16. The reflecting surface 17 has a structure for reflecting light effectively.

The liquid crystal lens 12 includes upper and lower boards 30 and 31 disposed to be faced and positioned at a distance from each other and comprising a transparent material, sealing materials 32 disposed in the distance at peripheral parts of the upper and lower boards 30 and 31, and a liquid crystal layer 33 inserted in an interspace between the upper and lower boards and comprising a nematic liquid crystal material, for example. The liquid crystal lens 12 has also an electrode film. The electrode film includes an upper electrode unit 34 having a plurality of electrodes comprising transparent conductive films such as ITO (indium tin oxide) provided on an inner surface of the upper board 30, and a lower electrode unit 35 having a plurality of electrodes of the ITO similar to the electrode unit 34, provided on an inner surface of the lower board 31, in the illustrated embodiment. In addition, numeral 36 denotes liquid crystal molecules inside the liquid crystal layer 33.

There are provided orientation films (not shown) on inner surfaces (surfaces contacting with the liquid crystal layer 36) of the upper and lower electrode units 34 and 35. The orientation films are provided with orientation treatment so as to tilt a longitudinal axis of each liquid crystal molecule at a predetermined angle relative to surfaces of the upper and lower boards 30 and 31 and align and orient in a predetermined direction in a state in which a voltage is not applied.

There is provided a controlling device 40 for controlling the liquid crystal lens 12 electrically, the controlling device 40 controls the liquid crystal lens 12 to change a focal length of light, broadening and narrowing directions of light, and changing the illuminating area of light, for example, in the illustrated embodiment. The controlling device will be described in detail hereinafter.

Figure 2:
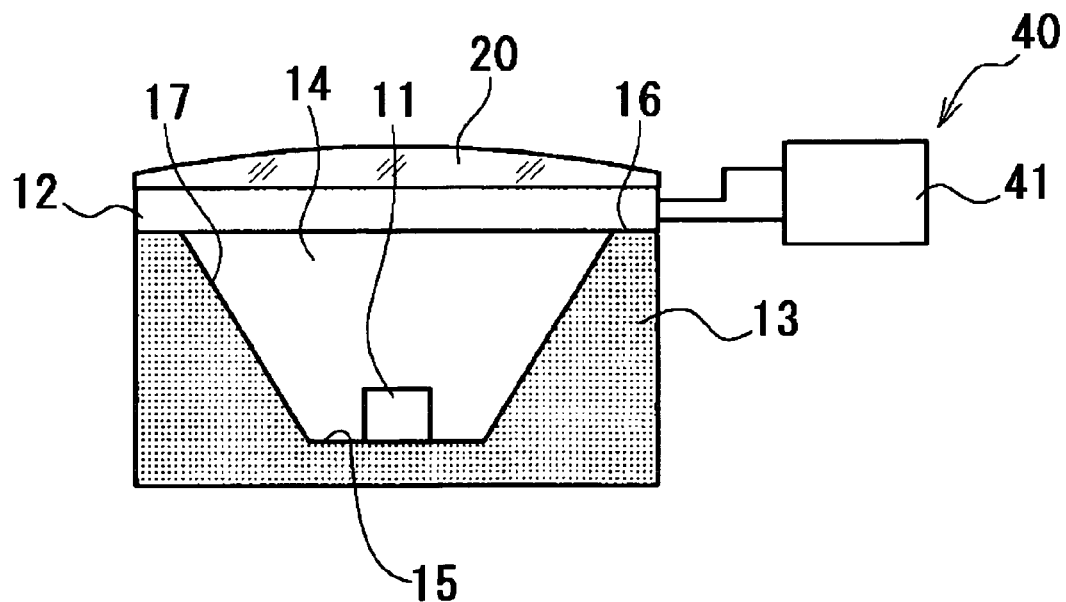
FIG. 2 is a sectional view showing a second embodiment of the light-emitting apparatus according to the present invention.

Referring to FIG. 2, a second embodiment of the light-emitting apparatus according to the present invention is illustrated.

The light-emitting apparatus in the second embodiment includes at least one lens 20 placed on the liquid crystal lens 12, other structure is the same as in the first embodiment. In the second embodiment, a normal convex lens is used as the lens 20. However, a concave lens may be used.

With the structure shown in the second embodiment, a variable range of the focal length of the liquid crystal lens 12 is compensated with the normal lens 20, a control scope for a focusing position by a voltage is corrected to a long and short distance, and the light-emitting apparatus can be applied in a wider scope of use. Here, the liquid crystal lens 12 can be used to have focusing property or dispersing property. Either the liquid crystal lens 12 or the normal lens 20 may be disposed to face the LED element 11.

The controlling device 40 includes a variable voltage source 41 in the illustrated embodiment. The variable voltage source 41 is connected with the upper and lower electrode units 34 and 35 which sandwich the liquid crystal layer 33 of the liquid crystal lens 12 therebetween, applies a predetermined voltage to the electrodes, and adjusts the voltage to control an optical characteristic of the liquid crystal lens 12, for example, a focal length. The liquid crystal lens 12 may be used together with a deflecting plate (not shown) disposed between the liquid crystal lens 12 and the LED element 11. A focusing state can be maintained or an illumination area can be switched narrowly and widely by changing the focal length of light through the liquid crystal lens with changing the voltage applied to the liquid crystal lens 12 by the variable voltage source 41, even if a distance between the light-emitting apparatus and the object illuminated by the light-emitting apparatus varies.

By changing the value of applied voltage to the liquid crystal lens 12, the light through the liquid crystal lens 12 can also be converted to illuminate a whole space. In other words, the present invention enables to focus light and also to radiate light in all directions by changing the applied voltage.

Referring again to FIG. 3, an electric and optical characteristic of the liquid crystal lens 12 according to the present invention, used for the two embodiments as described above commonly.

Figure 3:
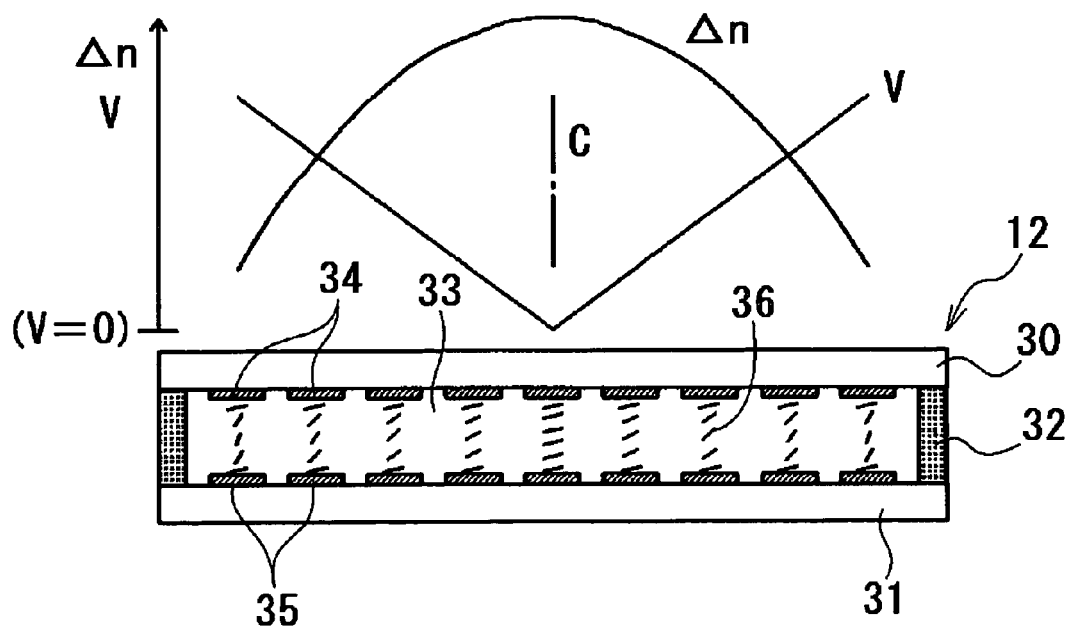
FIG. 3 is a schematic view showing a structure of one example of a liquid crystal lens used in the light-emitting apparatus, together with a graph showing an electric and optical characteristic thereof.

In FIG. 3, a graph depicted above the liquid crystal lens 12 includes a central axis C of the liquid crystal lens 12, and coincides with an initial orientation of the liquid crystal molecules 36.

Figure 4:
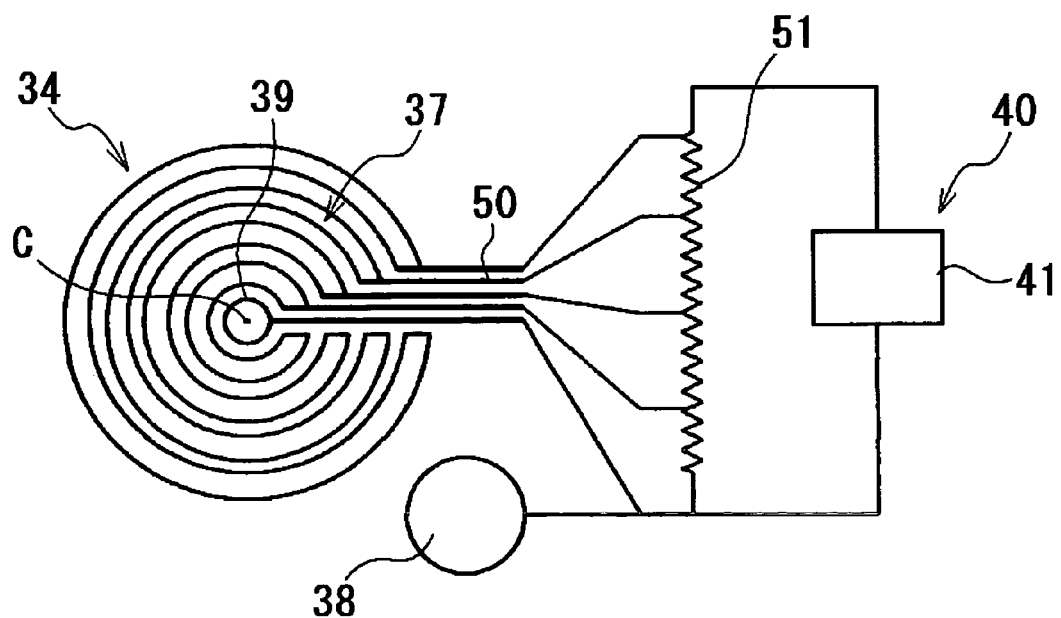
FIG. 4 is a schematic view showing a plan shape and an electric connection of an electrode structure in one example of the liquid crystal lens used in the light-emitting apparatus according to the present invention.

In the embodiment shown in FIGS. 3 and 4, each of the upper and lower electrode units 34 and 35 has a plurality of concentric annular electrodes. Meanwhile, one of the upper and lower electrode units may be formed into one disc-shaped electrode as a common electrode (see FIG. 4). In FIG. 4, the upper electrode unit including the annularly disposed electrodes is shown at 37, and the lower disc-shaped electrode is shown at 38. Moreover, the longitudinal axial direction of the liquid crystal molecules 36 in the liquid crystal layer 33 between the upper and lower electrode units 34 and 35 is shown in FIG. 4.

In the graph shown in FIG. 3, V denotes an upward and downward ideal voltage to be applied each portion of the liquid crystal layer 33 in a radial direction thereof, Δn denotes a value of an effective double refraction (a difference between refractive indexes of abnormal light and normal light) of each portion of the liquid crystal layer 33 in the radial direction, varying depending on the applied voltage.

In order to bring out convex lens operation having an optical axis corresponding to the central axis C to the liquid crystal layer 33 having a generally constant thickness, it is preferable to change the effective double refraction Δn of the liquid crystal layer 33 together with a radius into a paraboloid-like shape of revolution having an apex laying on the central axis C. To give such a change, the voltage V which is usually the alternate current and shown by the effective value is set to be zero (0) at the central axis C of the liquid crystal lens 12 in the embodiment, and increase in accordance with a distance from the central axis C in the radial direction. Because the voltage V is given stepwise by the annular or ring-shaped electrodes in an actual liquid crystal lens, the Δn also changes stepwise, but approximately, lens operation is obtained without a problem. Actually, within a few hundred of micrometers (μm) as a thickness of the liquid crystal layer, within a few (cm) as a diameter of the liquid crystal lens, and more a few (cm) as a focal length were obtained.

In this way, a direction of the liquid crystal molecules 36 in a state in which the voltage V is applied is described.

The initial orientation and the tilted angle of all the molecules in the liquid crystal layer are maintained because the voltage V is zero at the central portion, and the Δn is maximum. The liquid crystal molecules 36 adjacent the upper and lower boards 30 and 31 remain fixed due to orientation effect, while the tilted angle increases due to the voltage V at a deep portion in the liquid crystal layer 33 in a certain radius. Because the tilted angle of the liquid crystal molecules 36 increases as the voltage V increases, eventually, the tilted angle of the liquid crystal molecules 36 increases as going away from the central axis C at which the voltage is zero.

Because the Δn decreases as the tilted angle of the liquid crystal molecules, a quadratic curve-like characteristic with respect to the Δn as the graph shown in FIG. 3. Accordingly, if the deflecting plate (not shown) is overlapped in parallel with the liquid crystal lens 12 and only straight deflecting light vibrating in a direction parallel with a paper surface is selected and is entered in a direction of the central axis C, the deflecting light passes through portions having different refractive indexes depending on a radius from the central axis C in the liquid crystal lens 12.

In this embodiment, the liquid crystal lens whose refractive indexes increases as the radius increases have an effect similar to the normal convex lens for collecting light. Therefore, the liquid crystal lens here can have a light-focusing power.

By changing the applied voltage to the liquid crystal lens, the liquid crystal lens can also work as a concave lens broadening directions of light.

Next, a concrete example of a connection structure between the liquid crystal lens used in the light-emitting apparatus according to the present invention and the variable voltage source is described.

The upper electrode unit 34 has a plurality of concentrically disposed annular electrodes as described above. In addition, the upper electrode unit 34 has also a central electrode 39 at a central portion thereof.

The variable voltage source 41 has extraction electrodes 50 connected with the upper electrode unit 34, respectively. The extraction electrodes 50 are connected with a suitable intermediate point of a partial pressure-resistor 51 joining opposite ends of output terminals of the variable voltage source 41. A lead line connected with the central electrode 37 and the disc-like lower electrode 38 which is a common electrode are connected with reference potential sides of the variable voltage source 41 together. The lower electrode 38 is shown in a small disc-like shape in FIG. 4 for the sake of convenience, but, actually, it has the same diameter as or a diameter larger than the maximum diameter of the upper electrodes.

With such a structure, a higher voltage which is higher as the radius increases away from the central axis C is applied to the liquid crystal layer 33 of the liquid crystal lens 12 together with the increment of radius, except for a narrow sector portion occupying the extraction electrode 50 so that the liquid crystal lens 12 has a lens operation. Moreover, the voltage and the Δn in each radius are also varied proportionally and the focal length of the entire liquid crystal lens 12 can be changed by changing the output voltage of the variable voltage source 41 applied to the both ends of the partial pressure-resistor 51. Meanwhile, the lower electrode unit 35 may also be formed to have the annular electrodes, and a voltage in the opposite phase to the upper electrode unit 34 may be given to the annular electrodes.

Moreover, because the intermediate point of the partial pressure-resistor 51, with which the extraction electrode 50 is connected, can be selected optionally, a freely set characteristic can be given for "radius vs voltage", namely "radius vs Δn".

Figure 5:
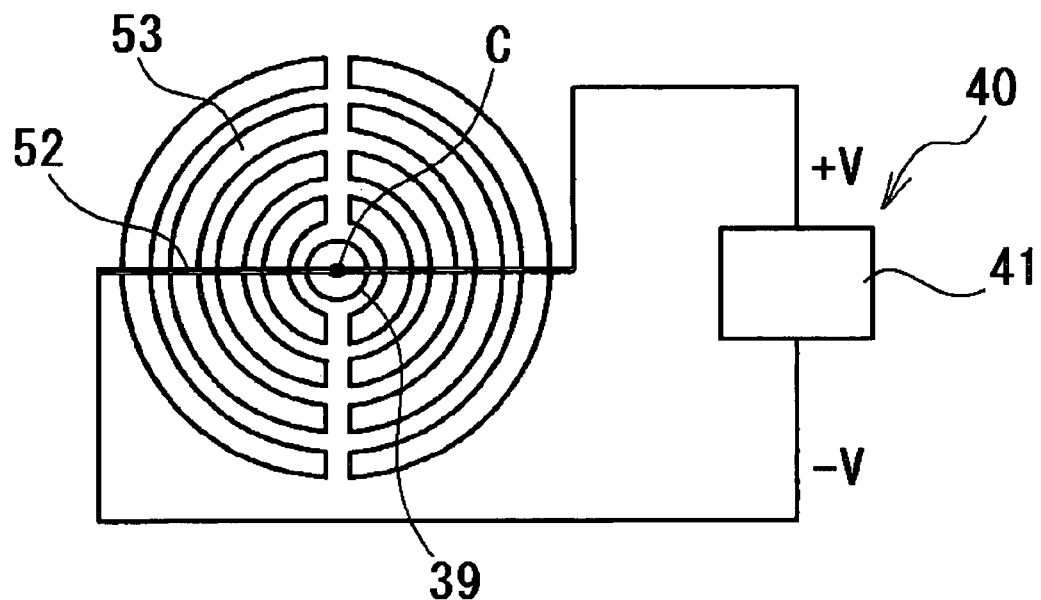
FIG. 5 is a schematic view showing a plan shape and an electric connection of an electrode structure in another example of the liquid crystal lens used in the light-emitting apparatus according to the present invention.

FIG. 5 illustrates another example of the liquid crystal lens used for the light-emitting apparatus according to the present invention.

In this embodiment, the upper electrode unit 34 comprises a straight electrode 52 extending radially of the liquid crystal lens and a plurality of semicircle-shaped circular electrodes 53 connected with the straight electrode 52.

Opposite ends of the straight electrode 52 are connected with the output terminals of the variable voltage source 41. The output terminals generate alternating voltage, which are opposite phases with respect to each other, in other words, signs (plus and minus) are different. Because the straight electrode 52 has an inherent resistance, it operates the operation similar to that of the partial pressure-resistor 51 in FIG. 4, voltages which have alternately different oscillation from manus V to plus V from the left to the right in FIG. 5 are imparted to each semicircle-shaped circular electrode 53. The oscillation of the voltage at the central portion of the circular electrode is zero.

Next, the electrodes in the lower electrode unit 35 are disposed in the same shape as that of the upper electrode unit 34, and the electrodes of both the electrode units are aligned to each other (not shown). However, the opposite ends of the straight electrode in the lower electrode unit 35 are connected with the terminals of the variable voltage source 41 in such a manner that the left of the opposite ends is +V, and the right thereof is −V. Consequently, the voltage applied in a direction of thickness of the liquid crystal layer 33 of the liquid crystal lens 12 varies straightly together with the radius so that oscillation at the peripheral portion of the liquid crystal layer is 2V, and the oscillation at the central portion thereof is zero. However, when a voltage is applied only to a narrow area of the liquid crystal layer perpendicular to the straight electrode 52, the liquid crystal molecules are not aligned in direction.

Next, a property of a liquid crystal material of the liquid crystal lens 12 is explained supplementary.

Figure 6:
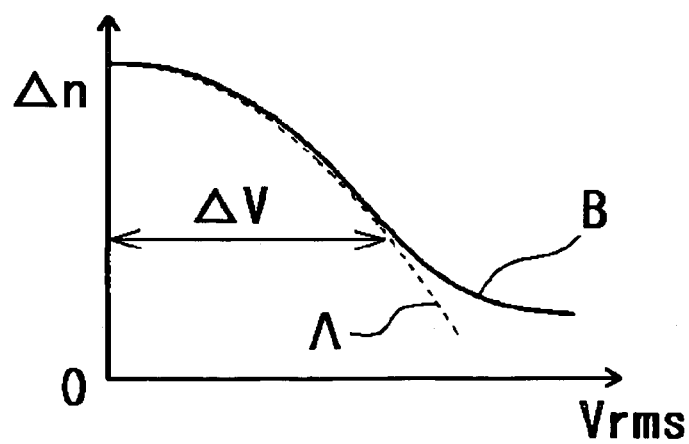
FIG. 6 is a graph showing an electric and optical characteristic of a liquid crystal material used in another example of the liquid crystal lens used in the light-emitting apparatus according to the present invention.

FIG. 6 is a graph showing an electric and optical characteristic of an especially preferable liquid crystal material with respect to the electrode structure as shown in FIG. 5.

Of materials of liquid crystal there is a material in which the effective double refraction Δn (curve B shown by solid line) to the applied voltage V rms (effective value) coincides approximately with the quadratic curve (curve A shown by the dotted line) in a range of used voltage ΔV. By selecting such a material, if it is used in the used voltage range ΔV, when a voltage proportional to the radius of the liquid crystal layer 33 of the liquid crystal lens 12 is applied as shown in the graph in FIG. 3 or the structure in FIG. 5, a double refraction value Δn varying in a paraboloid-like shape of revolution with respect to the radius is obtained. In this embodiment, the focal length of the liquid crystal lens 12 can be changed by changing the oscillation of output voltage of the variable voltage source 41.

Figure 7:
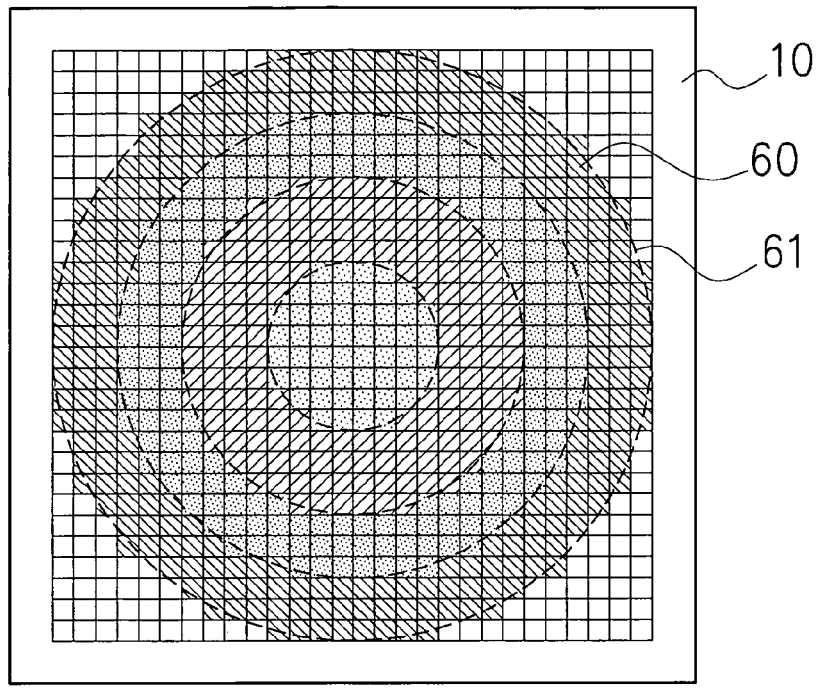
FIG. 7 is an explanatory view showing a plan structure in still another example of the liquid crystal lens used in the light-emitting apparatus according to the present invention.
Figure 8:
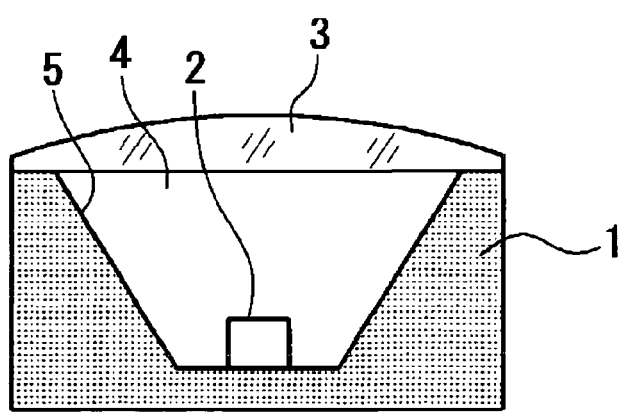
FIG. 8 is a sectional view of a conventional light-emitting apparatus.

FIG. 7 illustrates still another example of the liquid crystal lens 12 used in the light-emitting apparatus 10 according to the present invention. In this example, one group of electrodes for applying a voltage to the liquid crystal layer 33 of the liquid crystal lens 12 comprises a plurality of minute pixels 60.

The electrodes comprising the pixels are independent every each pixel, and each pixel 60 is adapted to execute an active matrix drive so that any voltage is given to each pixel by a TFT (thin-film transistor) or the like, or each pixel 60 is an intersecting point of upper and lower stripe-shaped electrodes and the stripe-shaped electrodes are adapted to execute a passive matrix drive, thereby different voltages are given every the pixel.

The plurality of pixels 60 are divided into a plurality of generally concentric circle-shaped bands by virtual rings 61 shown by the dotted lines, and controlled by a variable voltage source (not shown) so that the same voltage is applied to all the pixels included in each band to provide a predetermined Δn to liquid crystal in each band, as shown attaching various different patterns to the pixels, in FIG. 7.

As described above, although two embodiments in the light-emitting apparatus according to the present invention and three examples of the liquid crystal lens used in the light-emitting apparatus have been explained, a modified example is described hereinafter.

For example, a partial pressure point in the partial pressure resistor 51 may be adjusted in the example shown in FIG. 4, or in the example in FIG. 5 the used voltage range ΔV can be enlarged by changing partially a sectional area (width of electrode pattern) of the straight electrode 52 and correcting the shape of the straight electrode into a non-straight shape to adjust the characteristic of radius vs voltage so that a preferred characteristic of radius vs ΔV is obtained.

Moreover, the liquid crystal layer, in other words, the electrodes or the group of electrodes, to which the identical ΔV is given is not limited to the concentric ring in shape, as shown in the drawings. For example, the electrodes may be structured to have a polygonal or elliptical shape. Moreover, if the electrodes form the plurality of pixels, a fine control of Δn is required by location. Furthermore, if the distribution of voltage is changed, a characteristic of an aspheric lens can be obtained.

As always, the liquid crystal lens has not only the flat liquid crystal layer, but also a shallow concave spherical surface or Fresnel lens surface formed on the inner surface of at least one board and a convex lens or Fresnel lens formed on the liquid crystal layer between the boards. In this case, by providing a transparent electrode to cover all surface of the liquid crystal lens, a uniform variable voltage can be structured to give to the transparent electrode.

Because it is possible to have a variable effect for the focal length by the voltage even in the above-mentioned liquid crystal lenses, they can be used for the light-emitting apparatus according to the present invention. If the deflecting plate overlapped the liquid crystal lens is removed, because the abnormal light receiving the different refracting operation by the voltage and the normal light receiving the uniform refracting operation not by the voltage are focused on different positions, a lens having double focusing, in other words, a lens in which different focusing operations are mixed can be obtained. The obtained lens has, for example, an advantageous effect that the entire lens is illuminated uniformly and the central portion of the lens is clearly illuminated in particular.

Moreover, straight deflection in all directions can be used by combining two liquid crystal lenses having initial orientations which are different 90 degrees to each other, and the deflecting plate can be eliminated to form a bright light-emitting apparatus.

In addition, the light-emitting apparatus according to the present invention includes a combination of one LED element and one liquid crystal lens, but is not limited to the structure. For example, a plurality of beams can be obtained by a combination of one liquid crystal lens and a plurality of LED elements. Moreover, these beams can be controlled simultaneously. If a plurality of LED elements and a plurality of liquid crystal lenses disposed corresponding to the LED elements, respectively are arranged on a board having a large area in an array manner, a light-emitting apparatus having a large area and a great light intensity can be obtained. In this case, the plurality of liquid crystal lenses may be formed as one panel having a large area to achieve cost reduction.

Moreover, the light-emitting apparatus may be structured to include one liquid crystal lens and a plurality of LED elements disposed corresponding to the liquid crystal lens.

Furthermore, the light-emitting apparatus can use a structure in which a plurality of element/lens assemblies are supported by the above-mentioned case, each of the element/lens assemblies has at least one LED element and at least one liquid crystal lens.

In addition, if a focal length of each pair of the LED element and the liquid crystal element is controlled by the variable voltage source, a light-emitting apparatus varying an illumination distribution of the array-shaped light-emitting apparatus can be obtained.

Moreover, in the other embodiment, the light-emitting apparatus includes at least one liquid crystal shutter placed on the liquid crystal lens. For example, the liquid crystal shutter is disposed to overlap on the liquid crystal lens. The liquid crystal shutter can be structured so that an inner portion of the light-emitting apparatus cannot be seen from outside, if needed. Here, the liquid crystal lens has a structure in which electrodes are provided on the entire surface of a TN liquid crystal panel, a predetermined voltage is applied to the electrodes to allow a rear side of the panel to form in a visible state or invisible state. Because a control voltage for the liquid crystal shutter can be obtained from the variable voltage source and one deflecting plate can be used commonly, the entire structure of the light-emitting apparatus is not so complicated.

Moreover, a plurality of liquid crystal lenses may be used to overlap. Because the liquid crystal shutter has a structure close to the liquid crystal lens extremely, it is possible to form the two integrally. Furthermore, a switch or a simple functionoperating mechanism, for example, a non-circular shaped liquid crystal lens or a rotatable deflecting plate and so on may be provided.

The light-emitting apparatus according to the present invention has a very high general versatility because the illumination characteristic can be switched optionally throughout a wider range by the simple electric controlling operation.

If a fixed or half-fixed object is illuminated, because it is possible to provide a light-emitting apparatus having the same structure, while suitable to different uses by applying predetermined different fixed or half-fixed (selectable from a small number of setting voltage sets) voltages to one or several types of light-emitting apparatuses, or changing or substituting only an additional normal lens for any one, the light-emitting apparatus can be used in small-scale-production efficiently.

What is claimed is:

1. A light-emitting apparatus, comprising:
    at least one light-emitting diode element;
    at least one liquid crystal lens including a liquid crystal layer, disposed to face the at least one light-emitting diode element, and positioned at a distance from the at least one light-emitting diode element, and
    an electrode unit including a plurality of minute pixels disposed in concentric circles, adjacent to the liquid crystal layer.

2. The light-emitting apparatus according to claim 1, further comprising:
    at least one lens disposed on an upper surface of the liquid crystal lens.

3. The light-emitting apparatus according to claim 1, wherein the light-emitting diode element and the liquid crystal lens are supported by a case.

4. The light-emitting apparatus according to claim 3, wherein the case has a light-emitting-diode element-mounting surface for disposing the light-emitting diode element thereon, a lens-mounting surface for disposing a peripheral portion of the liquid crystal lens thereon, and a reflecting surface extending from the light-emitting-diode element-mounting surface to the lens-mounting surface.

5. The light-emitting apparatus according to claim 1, further comprising:
    at least one liquid crystal shutter placed on the liquid crystal lens.

6. The light-emitting apparatus according to claim 1, further comprising a control device to apply a voltage to the liquid crystal lens through the plurality of minute pixels.

7. The light-emitting apparatus according to claim 6, wherein the control device includes a variable voltage source for controlling the applied voltage.

8. The light-emitting apparatus according to claim 1, including one liquid crystal lens and a plurality of light-emitting diode elements disposed to face the liquid crystal lens.

9. A light-emitting apparatus, comprising:
    at least one light-emitting diode element having an emission surface;
    at least one liquid crystal lens having two transparent boards, a liquid crystal layer inserted between the two transparent boards and an electrode unit including a plurality of minute pixels disposed in concentric circles provided on the inner surface of each transparent board and controlling the direction of liquid crystal molecules in the liquid crystal layer, and having a focal length adjusted by applying a desired voltage to each of the plurality of minute pixels;
    wherein the at least one liquid crystal lens is disposed to face the emission surface of the at least one light-emitting diode element.

\* \* \* \* \*